United States Patent
Li et al.

(10) Patent No.: US 9,897,787 B2
(45) Date of Patent: Feb. 20, 2018

(54) TELECENTRIC OPTICAL LENS

(71) Applicant: HAN'S LASER TECHNOLOGY INDUSTRY GROUP CO., LTD., Shenzhen (CN)

(72) Inventors: Jiaying Li, Shenzhen (CN); Chaoming Zhou, Shenzhen (CN); Bo Sun, Shenzhen (CN); Yuqing Chen, Shenzhen (CN); Yunfeng Gao, Shenzhen (CN)

(73) Assignee: HAN'S LASER TECHNOLOGY INDUSTRY GROUP CO., LTD., Shenzhen (CN)

(\*) Notice: Subject to any disclaimer, the term of this patent is extended or adjusted under 35 U.S.C. 154(b) by 0 days.

(21) Appl. No.: 15/328,919

(22) PCT Filed: Sep. 17, 2014

(86) PCT No.: PCT/CN2014/086735
§ 371 (c)(1),
(2) Date: Jan. 25, 2017

(87) PCT Pub. No.: WO2016/041161
PCT Pub. Date: Mar. 24, 2016

(65) Prior Publication Data
US 2017/0248776 A1 Aug. 31, 2017

(51) Int. Cl.
*G02B 9/62* (2006.01)
*G02B 13/22* (2006.01)
(52) U.S. Cl.
CPC ............... *G02B 13/22* (2013.01); *G02B 9/62* (2013.01)
(58) Field of Classification Search
CPC ...................................................... G02B 13/22

USPC ......................................................... 359/762
See application file for complete search history.

(56) References Cited

U.S. PATENT DOCUMENTS

| | | |
|---|---|---|
| 3,947,094 A | 3/1976 | Ikemori |
| 4,880,299 A | 11/1989 | Hamada |
| 2010/0053774 A1* | 3/2010 | Baba ................ G02B 9/34 359/755 |

FOREIGN PATENT DOCUMENTS

| | | |
|---|---|---|
| CN | 201740909 U | 2/2011 |
| CN | 203799099 U | 8/2014 |
| JP | 2014092583 A | 5/2014 |

OTHER PUBLICATIONS

International Search Report dated May 27, 2015 issued in corresponding International Application No. PCT/CN2014/086735, pp. 1-2.

\* cited by examiner

*Primary Examiner* — James Jones
(74) *Attorney, Agent, or Firm* — Polsinelli PC

(57) ABSTRACT

A telecentric optical lens (100), comprising a first lens (L1) to a fifth lens (L5) arranged sequentially and co-axially along the direction of transmission of the incident light ray; the first lens (L1) is a plano-concave negative lens; the second lens (L2) is a meniscus negative lens; the third lens (L3) is a meniscus negative lens; the fourth lens (L4) is a biconvex positive lens; and the fifth lens (L5) is a plano-concave negative lens; the arrangement and design parameters of the first lens (L1) to the fifth lens (L5) of the telecentric optical lens (100) allow said telecentric optical lens (100) to achieve a telecentric effect, and simultaneously satisfy achromatic and relatively large aperture requirements.

8 Claims, 5 Drawing Sheets

TELECENTRIC OPTICAL LENS

CROSS REFERENCE TO RELATED APPLICATIONS

This application is a National Phase filing and claims priority under 35 U.S.C. §371 of PCT/CN2014/086735 filed on Sep. 17, 2014. The entire content of the PCT application is hereby incorporated by reference.

FIELD OF THE INVENTION

The present disclosure relates to an optical lens, and more particularly, relates to a telecentric optical lens.

BACKGROUND OF THE INVENTION

With the development of the laser processing technology, particularly the development of the optical system, a conventional f-θ (scanning objective) optical lens can achieve a telecentric effect by a combinational design of several optical lens, i.e. the telecentric optical lens. However, due to a configuration of the optical parameters of the several optical lenses and a design of distances among the several optical lenses of the telecentric optical lens, the telecentric optical lens cannot meet achromatic and relatively large aperture requirements at the same time.

SUMMARY

Accordingly, it is necessary to provide a telecentric optical lens which can meet achromatic and relatively large aperture requirements simultaneously.

A telecentric optical lens, includes a first lens to a fifth lens which are successively and coaxially arranged along a transmission direction of an incident light ray; wherein the first lens is a plano-concave negative lens which includes a first curved surface and a second curved surface; the second lens is a meniscus negative lens which includes a third curved surface and a fourth curved surface; the third lens is a meniscus negative lens which includes a fifth curved surface and a sixth curved surface; the fourth lens is a biconvex positive lens which includes a seventh curved surface and a eighth curved surface; and the fifth lens is a plano-concave negative lens includes a ninth curved surface and a tenth curved surface; two curved surfaces of each lens are a light incident surface and a light emergent surface, respectively, the first curved surface to the tenth curved surface are successively arranged along the transmission direction of the incident light ray, the first curved surface, the third curved surface, the fourth curved surface, the fifth curved surface, and the sixth curved surface, and the ninth curved surface are all convex along the transmission direction of the incident light, the seventh curved surface is convex opposite to the transmission direction of the incident light, the second curved surface and the tenth surface are planar surfaces, a radius of curvature of the first curved surface is −50±5% millimeters, radiuses of curvature of the third curved surface to the ninth curved surface are −121±5%, −80.1±5%, −606±5%, −100±5%, 250±5%, −200±5%, and −150±5%, respectively, and the unit is millimeter.

According to one embodiment, central thicknesses of the first to the fifth lenses are 5±5%, 10±5%, 26±5%, 28±5%, and 4±5%, respectively, and the unit is millimeter.

According to one embodiment, a distance between the second curved surface and the third curved surface along an optical axis, a distance between the fourth curved surface and the fifth curved surface along the optical axis, a distance between the sixth curved surface and the seventh curved surface along the optical axis, and a distance between the eighth curved surface and the ninth curved surface along the optical axis are 7±5%, 0.5±5%, 0.5±5%, and 12±5%, respectively, and the unit is millimeter.

According to one embodiment, the first lens has a ratio of refractive index to Abbe number of (1.8/26)±5%, the second lens to the fourth lens have ratios of refractive index to Abbe number of (1.7/50)±5%, and the fifth lens has a ratio of refractive index to Abbe number of (1.6/35)±5%.

According to one embodiment, external diameters of the first lens to the fifth lens are 94±5%, 100±5%, 120±5%, 140±5%, and 140±5%, respectively, and the unit is millimeter.

According to one embodiment, the telecentric optical lens includes a sixth lens, wherein the sixth lens includes an eleventh curved surface which serves as a light incident surface and a twelfth curved surface which serves as a light emergent surface, a distance between the eleventh curved surface and the twelfth curved surface along an optical axis is 2±5% millimeters, and the sixth lens is a planar lens.

According to one embodiment, the sixth lens is a protective glass which has a central thickness of 4±5% millimeters, the sixth lens has a ratio of refractive index to Abbe number of (1.5/64)±5%, and an external diameter of the sixth lens is 140±5% millimeters.

According to one embodiment, a focal length of the telecentric optical lens is 170 millimeters, a pupil aperture is 30 millimeters, a working wavelength ranges from 1064 nanometers to 630 nanometers, and a maximum working area is 104×104 square millimeters.

By an arrangement and design parameters of the first lens to the fifth lens of the telecentric optical lens, the telecentric optical lens is allowed to achieve a telecentric effect, and satisfy achromatic and relatively large aperture requirements simultaneously.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION OF THE EMBODIMENTS

The above and other objects, features and advantages of the present invention will become more apparent by describing in detail with reference to the accompanying drawings. Although the invention is illustrated and described herein with reference to specific embodiments, the invention is not intended to be limited to the details shown. Rather, various modifications may be made in the details within the scope and range of equivalents of the claims and without departing from the invention.

It should be noted that the negative sign used herein means the ray propagates from left to right. Taking the intersection point of the spherical surface and the principal optical axis as a reference point, if the center of the spherical surface is in the left of the intersection point, the radius of curvature has a negative value, if, on the other hand, the center of the spherical surface is in the right of the intersection point, the radius of curvature has a positive value. In addition, in view of the ray propagating from left to right, one side on the left of the lens is referred as the object side, and the other side on the right of the lens is referred as the image side. The positive lens indicates a lens which has a central thickness greater than a peripheral thickness, and the negative lens indicates a lens which has a central thickness less than a peripheral thickness.

Figure 1:
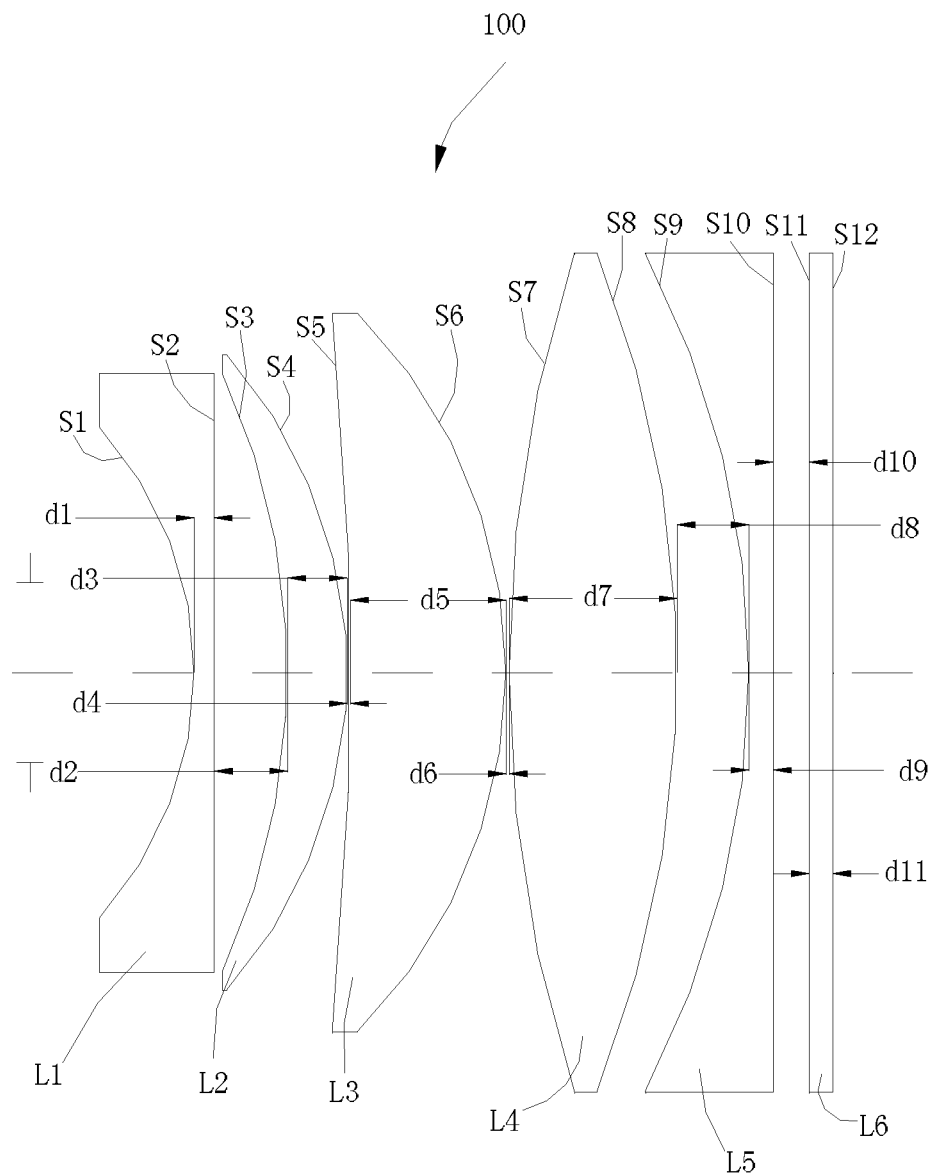
FIG. 1 is a side view of a telecentric optical lens according to an embodiment.

FIG. 1 is a side view of a telecentric optical lens 100 according to one embodiment, showing a related portion of the present disclosure for simple illustration. The telecentric optical lens 100 includes a first lens L1, a second lens L2, a third lens L3, a fourth lens L4, a fifth lens L5, and a sixth lens L6, which are successively and coaxially arranged along a transmission direction of an incident light ray. The first lens L1 is a plano-concave negative lens, the second lens L2 is a meniscus negative lens, the third lens L3 is a meniscus negative lens, the fourth lens L4 is a biconvex positive lens, the fifth lens L5 is a plano-concave negative lens, and the sixith lens L6 is a planar lens. The first lens L1 includes a first curved surface S1 and a second curved surface S2. The second lens L2 includes a third curved surface S3 and a fourth curved surface S4. The third lens L3 includes a fifth curved surface S5 and a sixth curved surface S6. The fourth lens L4 includes a seventh curved surface S7 and an eighth curved surface S8. The fifth lens L5 includes a ninth curved surface S9 and a tenth curved surface S10. The sixth lens L6 includes an eleventh curved surface S11 and a twelfth curved surface S12. Two curved surfaces of each lens serve as a light incident surface and a light emergent surface, respectively. The first curved surface S1 to the twelfth curved surface S12 are successively arranged along the transmission direction of the incident light ray. Convex directions of the first curved surface S1, the second curved surface S2, the third curved surface S3, the fourth curved surface S4, the fifth curved surface S5, and the sixth curved surface S6, and the ninth curved surface S9 are the same, which are convex along the transmission direction of the incident light (i.e. the object side). The seventh curved surface S7 is convex opposite to the transmission direction of the incident light (i.e. the image side). The tenth curved surface S10, the eleventh curved surface S11, and the twelfth curved surface S12 are planar surfaces. In the illustrated embodiment, the sixth lens L6 is a protective glass. It can be understood that the sixth lens L6 can be omitted.

In addition, inventor has made designs to corresponding structural parameters of aforementioned five lens. Specifically:

The first lens L1 has a ratio of refractive index to Abbe number of (1.8/26)±5%. The first curved surface S1 of the first lens L1 is convex to the image side, a radius of curvature of the first curved surface S1 is −50 millimeters. The second curved surface S2 is a planar surface, an external diameter D1 of the first lens L1 is 94 millimeters. Aforementioned parameters of the first lens L1 have a tolerance range of 5%, i.e. each parameter varying within a range of ±5% is permitted.

The second lens L2 has a ratio of refractive index to Abbe number of (1.7/50)±5%. The third curved surface S3 of the second lens L2 is convex to the image side, and a radius of curvature of the third curved surface S3 is −121 millimeters. The fourth curved surface S4 is convex to the image side, and a radius of curvature of the fourth curved surface S4 is −80.1 millimeters. A central thickness d3 of the second lens L2 is 10 millimeters. An external diameter D2 of the second lens L2 is 100 millimeters. Aforementioned parameters of the second lens L2 have a tolerance range of 5%.

The third lens L3 has a ratio of refractive index to Abbe number of (1.7/50)±5%. The fifth curved surface S5 of the third lens L3 is convex to the image side, and a radius of curvature of the fifth curved surface S5 is −606 millimeters. The sixth curved surface S6 is convex to the image side, and a radius of curvature of the sixth curved surface S6 is −100 millimeters. A central thickness d5 of the third lens L3 is 26 millimeters. An external diameter of the third lens L3 is 120 millimeters. Aforementioned parameters of the third lens L3 have a tolerance range of 5%.

The fourth lens L4 has a ratio of refractive index to Abbe number of (1.7/50)±5%. The seventh curved surface S7 of the fourth lens L4 is convex to the object side, and a radius of curvature of the seventh curved surface S7 is 250 millimeters. The eighth curved surface S8 is convex to the image side, and a radius of curvature of the eighth curved surface S8 is −200 millimeters. A central thickness d7 of fourth lens L4 is 28 millimeters. An external diameter of the fourth lens L4 is 140 millimeters. Aforementioned parameters of the fourth lens L4 have a tolerance range of 5%.

The fifth lens L5 has a ratio of refractive index to Abbe number of (1.6/35)±5%. The ninth curved surface S9 of the fifth lens L5 is convex to the image side, and a radius of curvature of the ninth curved surface S9 is −150 millimeters. The tenth surface S10 is a planar surface, and a radius of curvature of the tenth surface S10 is ∞. A central thickness d9 of fifth lens L5 is 4 millimeters. An external diameter of the fifth lens L5 is 140 millimeters. Aforementioned parameters of the fifth lens L5 have a tolerance range of 5%.

The sixth lens L6 has a ratio of refractive index to Abbe number of (1.5/64)±5%. The eleventh curved surface S11 and the twelfth curved surface S12 of the sixth lens L6 are planar surfaces, and radiuses of curvature of the eleventh curved surface S11 and the twelfth curved surface S12 are ∞. A central thickness d11 of the sixth lens L6 is 4 millimeters. An external diameter of the sixth lens L6 is 140 millimeters. Aforementioned parameters of the sixth lens L6 have a tolerance range of 5%

In addition, inventor has made designs to distances among every adjacent lens. Specifically, a distance d2 between an emergent surface (the second curved surface S2) of the first lens L1 and an incident surface (the third curved surface S3) of the second lens L2 along an optical axis is 7 millimeters, with a tolerance of 5%. A distance d4 between an emergent surface (the fourth curved surface S4) of the second lens L2 and an incident surface (the fifth curved surface S5) of the third lens L3 along the optical axis is 0.5 millimeters, with a tolerance of 5%. A distance d6 between an emergent surface (the sixth curved surface S6) of the third lens L3 and an incident surface (the seventh curved surface S7) of the fourth lens L4 along the optical axis is 0.5 millimeters, with a tolerance of 5%. A distance d8 between an emergent surface (the eighth curved surface S8) of the fourth lens L4 and an incident surface (the ninth curved surface S9) of the fifth lens L5 along the optical axis is 12 millimeters, with a tolerance of 5%. A distance d10 between an emergent surface (the tenth curved surface S10) of the fifth lens L5 and an incident surface (the eleventh curved surface S11) of the sixth lens L6 along the optical axis is 2 millimeters, with a tolerance of 5%.

With aforementioned designs, the optical parameters of the telecentric optical lens 100 are that: a focal length is 170 millimeters, a pupil aperture is 30 millimeters, a working wavelength ranges from 1064 nanometers to 630 nanometers, and a maximum working area reaches 104×104 square millimeters.

Experimental test results of above telecentric optical lens 100 are shown as FIG. 2 through FIG. 5.

Figure 2:
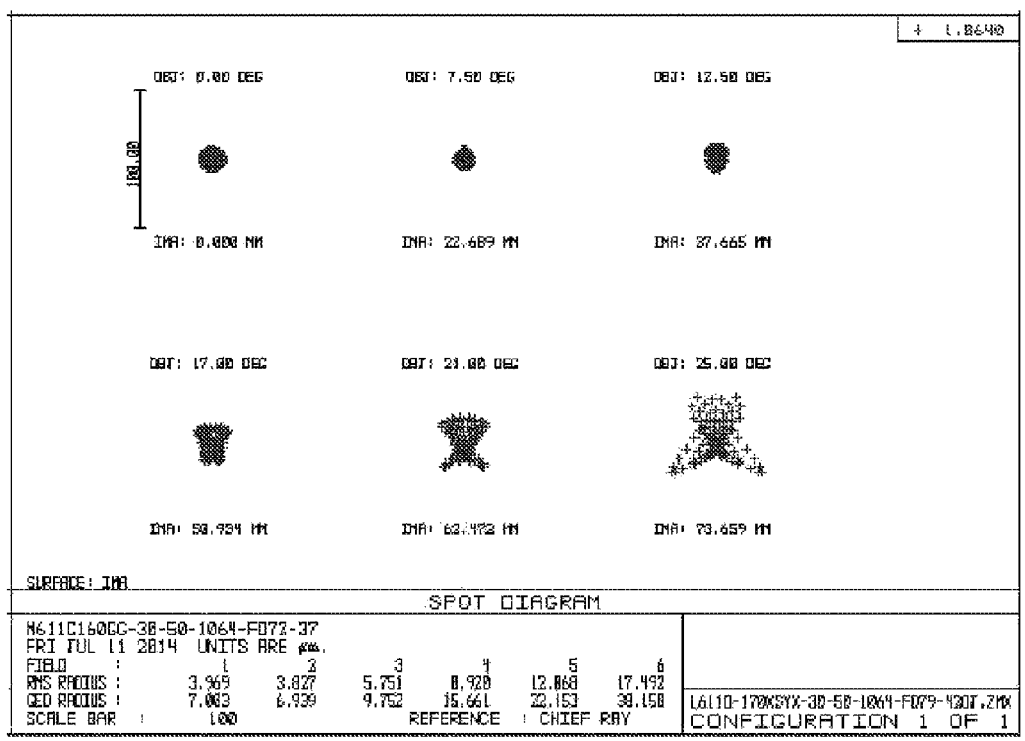
FIG. 2 is graphic diagram showing dispersion spot of the telecentric optical lens of the illustrated embodiment of FIG. 1.

FIG. 2 is a graphic diagram showing geometry aberration of the telecentric optical lens 100 of FIG. 1. DBJ represents a visual angle, the unit is degree. IMA represents an imaging diameter, the unit is millimeter. FIG. 2 shows a scale length of 100 millimeters. According to the dispersion spots of FIG. 2, it can be seen that, a dispersion area of a focus spot of the telecentric optical lens 100 is relative small, energy is concentrated on the focus point, and the aberrations on the axis and off the axis are corrected better, and reach an ideal resolution. The geometry dispersion circles in the full visual angle have a diameter of 0.01 millimeters, and also reach an ideal extent.

Figure 3:
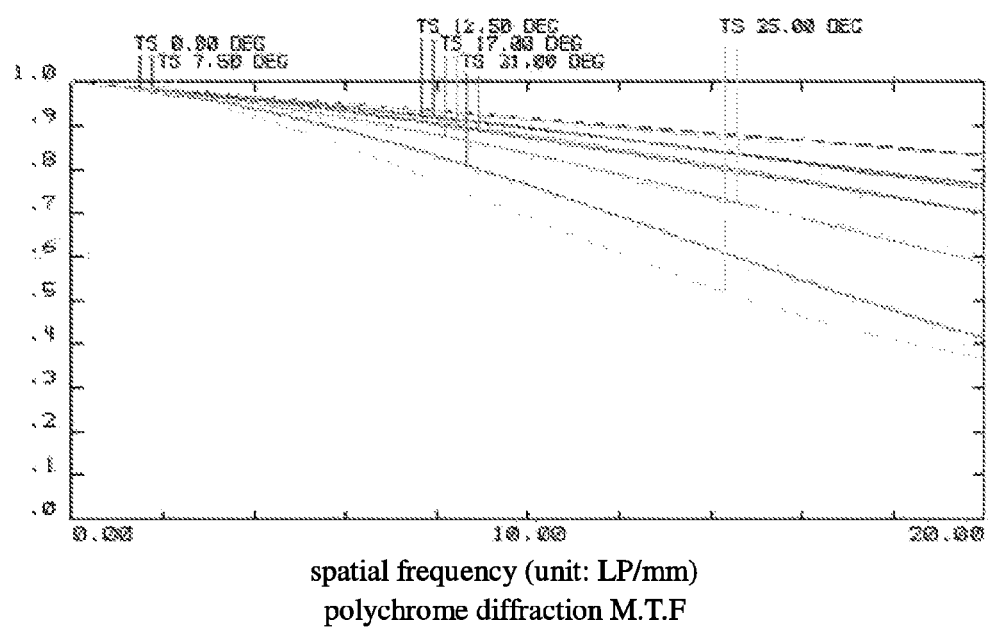
FIG. 3 is a graphic diagram showing modulation transfer function M.T.F characteristic of the telecentric optical lens of the illustrated embodiment of FIG. 1.

FIG. 3 is a graphic diagram showing modulation transfer function M.T.F characteristic of the telecentric optical lens 100 of the illustrated embodiment of FIG. 1. The horizontal ordinate represents a resolution, the unit is line pairs per millimeter. TS represents a field angle, the unit is degree. When the resolution reaches 20 line pairs per millimeter, the M.T.F is still more than 0.5, which is sufficient to satisfy a requirement of a laser processing.

Figure 4:
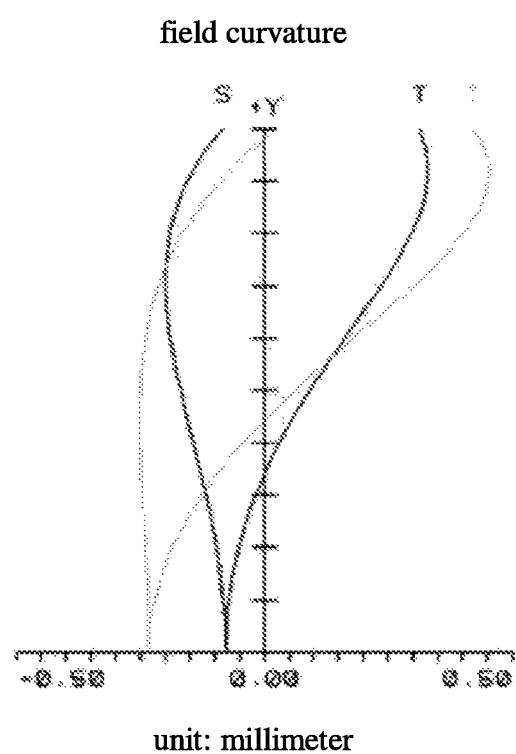
FIG. 4 is a graphic diagram showing chromatic dispersion of the telecentric optical lens of the illustrated embodiment of FIG. 1.
Figure 5:
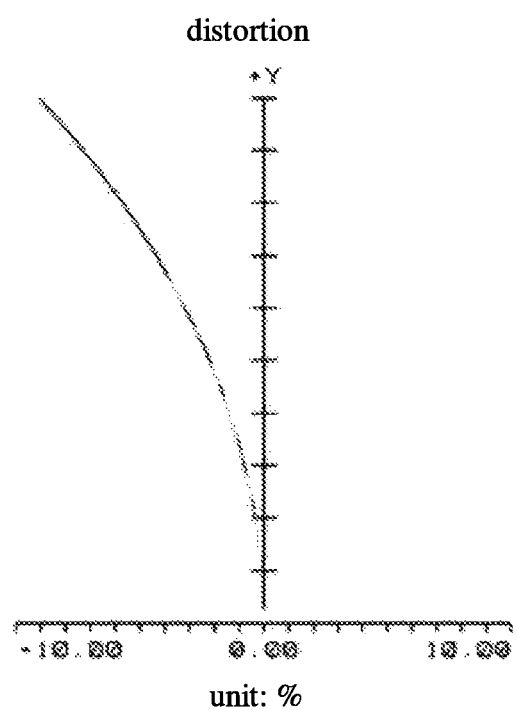
FIG. 5 is a graphic diagram showing distortion of the telecentric optical lens of the illustrated embodiment of FIG. 1.

FIG. 4 is a graphic diagram showing chromatic dispersion of the telecentric optical lens 100 of the illustrated embodiment of FIG. 1. The vertical ordinate in FIG. 4 represents a visual angle, the unit of the horizontal ordinate is millimeter. FIG. 5 is a graphic diagram showing distortion of the telecentric optical lens 100 of the illustrated embodiment of FIG. 1. The vertical ordinate +Y in FIG. 5 represents a visual angle, the unit of the horizontal ordinate is percentage. It can be seen from FIG. 4 and FIG. 5, an axial chromatic aberration $\Delta$ CI of the telecentric optical lens 100 is about 0.15, and a magnification chromatic aberration $\Delta$ CI$\approx$0, which reaches an ideal extent.

In a conclusion, by an arrangement and design parameters of the first lens to the fifth lens of the telecentric optical lens 100, the telecentric optical lens 100 is allowed to achieve a telecentric effect, and simultaneously satisfy achromatic and relatively large aperture requirements.

The above are several embodiments of the present invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. A telecentric optical lens, comprising a first lens to a fifth lens which are successively and coaxially arranged along a transmission direction of an incident light ray;
   wherein the first lens is a plano-concave negative lens which comprises a first curved surface and a second curved surface;
   the second lens is a meniscus negative lens which comprises a third curved surface and a fourth curved surface;
   the third lens is a meniscus negative lens which comprises a fifth curved surface and a sixth curved surface;
   the fourth lens is a biconvex positive lens which comprises a seventh curved surface and a eighth curved surface; and
   the fifth lens is a plano-concave negative lens comprises a ninth curved surface and a tenth curved surface;
   two curved surfaces of each lens are a light incident surface and a light emergent surface, respectively, the first curved surface to the tenth curved surface are successively arranged along the transmission direction of the incident light ray, the first curved surface, the third curved surface, the fourth curved surface, the fifth curved surface, and the sixth curved surface, and the ninth curved surface are all convex along the transmission direction of the incident light, the seventh curved surface is convex opposite to the transmission direction of the incident light, the second curved surface and the tenth surface are planar surfaces, a radius of curvature of the first curved surface is −50±5% millimeters, radiuses of curvature of the third curved surface to the ninth curved surface are −121±5%, −80.1±5%, −606±5%, −100±5%, 250±5%, −200±5%, and −150±5%, respectively, and the unit is millimeter.

2. The telecentric optical lens according to claim 1, wherein central thicknesses of the first to the fifth lenses are 5±5%, 10±5%, 26±5%, 28±5%, and 4±5%, respectively, and the unit is millimeter.

3. The telecentric optical lens according to claim 1, wherein a distance between the second curved surface and the third curved surface along an optical axis, a distance between the fourth curved surface and the fifth curved surface along the optical axis, a distance between the sixth curved surface and the seventh curved surface along the optical axis, and a distance between the eighth curved surface and the ninth curved surface along the optical axis are 7±5%, 0.5±5%, 0.5±5%, and 12±5%, respectively, and the unit is millimeter.

4. The telecentric optical lens according to claim 1, wherein the first lens has a ratio of refractive index to Abbe number of (1.8/26)±5%, the second lens to the fourth lens have ratios of refractive index to Abbe number of (1.7/50)±5%, and the fifth lens has a ratio of refractive index to Abbe number of (1.6/35)±5%.

5. The telecentric optical lens according to claim 1, wherein external diameters of the first lens to the fifth lens are 94±5%, 100±5%, 120±5%, 140±5%, and 140±5%, respectively, and the unit is millimeter.

6. The telecentric optical lens according to claim 1, further comprising a sixth lens, wherein the sixth lens comprises an eleventh curved surface which serves as a light incident surface and a twelfth curved surface which serves as a light emergent surface, a distance between the eleventh curved surface and the twelfth curved surface along an optical axis is 2±5% millimeters, and the sixth lens is a planar lens.

7. The telecentric optical lens according to claim 6, wherein the sixth lens is a protective glass which has a central thickness of 4±5% millimeters, the sixth lens has a ratio of refractive index to Abbe number of (1.5/64)±5%, and an external diameter of the sixth lens is 140±5% millimeters.

8. The telecentric optical lens according to claim 1, wherein a focal length of the telecentric optical lens is 170 millimeters, a pupil aperture is 30 millimeters, a working wavelength ranges from 1064 nanometers to 630 nanometers, and a maximum working area is 104×104 square millimeters.

* * * * *